United States Patent
Lo et al.

(10) Patent No.: US 10,857,822 B2
(45) Date of Patent: Dec. 8, 2020

(54) PRINT ENGINE AND ACCESSORY MATING

(71) Applicant: Hewlett-Packard Development Company, L.P., Spring, TX (US)

(72) Inventors: Kevin Lo, Vancouver, WA (US); Wee Teck Woon, Singapore (SG); Alexander M Nameroff, Vancouver, WA (US); Dan Canfield, Portland, OR (US); Anthony Carcia, Portland, OR (US); Robert Luffel, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/331,591

(22) PCT Filed: Sep. 9, 2016

(86) PCT No.: PCT/US2016/051165
§ 371 (c)(1),
(2) Date: Mar. 8, 2019

(87) PCT Pub. No.: WO2018/048431
PCT Pub. Date: Mar. 15, 2018

(65) Prior Publication Data
US 2019/0358975 A1    Nov. 28, 2019

(51) Int. Cl.
*B41J 29/02*        (2006.01)
*G03G 21/16*       (2006.01)
(Continued)

(52) U.S. Cl.
CPC ........ *B41J 29/026* (2013.01); *G03G 21/1619* (2013.01); *B41J 13/103* (2013.01);
(Continued)

(58) Field of Classification Search
CPC ...... B41J 29/02; B41J 29/026; B41J 2202/19; B41J 29/13; B41J 13/103; B65H 2402/10;
(Continued)

(56) References Cited

U.S. PATENT DOCUMENTS 4,781,480 A * 11/1988 Kikuchi ................... B41J 11/54
  400/607
5,132,713 A    7/1992 Christy et al.
(Continued)

FOREIGN PATENT DOCUMENTS

DE          4225751 A1    12/1992
JP          0392870 A      4/1991

*Primary Examiner* — John Zimmermann
(74) *Attorney, Agent, or Firm* — HP Inc. Patent Department

(57) ABSTRACT

An accessory mating system for mating a print engine to an accessory may include a pin and a pin receiving detent. The pin has a collar having a pin vertical axis datum surface and a shaft extending from the collar. The shaft provides left-right axis datum surfaces and second opposite sides providing fore-aft axis datum surfaces. The pin receiving detent receives the pin. The pin receiving detent may include a detent perimeter providing a detent vertical axis datum surface, first opposite internal sides providing first detent left-right axis datum surfaces facing the pin left-right axis datum surfaces and second opposite internal sides providing detent fore-aft axis datum surfaces.

14 Claims, 5 Drawing Sheets

(51) Int. Cl.
*G03G 15/00* (2006.01)
*B41J 13/10* (2006.01)
*B41J 29/13* (2006.01)

(52) U.S. Cl.
CPC .............. *B41J 29/02* (2013.01); *B41J 29/13* (2013.01); *G03G 15/6502* (2013.01)

(58) Field of Classification Search
CPC ........... B65H 2402/61; G03G 15/6502; G03G 21/1609; G03G 21/1619
See application file for complete search history.

(56) References Cited

U.S. PATENT DOCUMENTS

| | | | |
|---|---|---|---|
| 5,150,166 A * | 9/1992 | Matsuura | B41J 11/58 347/153 |
| 5,620,269 A | 4/1997 | Gustafson | |
| 5,666,595 A * | 9/1997 | Sameshima | G03G 15/00 24/658 |
| 6,287,032 B1 | 9/2001 | Osmus et al. | |
| 7,543,808 B2 | 6/2009 | Silverbrook | |
| 8,182,082 B2 | 5/2012 | Chan et al. | |
| 8,550,617 B2 | 10/2013 | Rosali et al. | |
| 8,678,550 B2 | 3/2014 | Silverbrook | |
| 8,910,929 B2 | 12/2014 | Walsh et al. | |
| 10,067,460 B2 * | 9/2018 | Uehara | G03G 15/6502 |
| 2002/0090246 A1 | 7/2002 | Baker et al. | |
| 2003/0007321 A1 * | 1/2003 | Dayley | H05K 5/0021 361/679.6 |
| 2004/0089618 A1 * | 5/2004 | Lauchner | H05K 5/0021 211/26 |
| 2006/0291943 A1 | 12/2006 | Jeong et al. | |
| 2013/0099638 A1 * | 4/2013 | Pala | B41J 29/02 312/223.2 |
| 2014/0197065 A1 * | 7/2014 | Prince | B65D 21/0213 206/503 |
| 2018/0273314 A1 * | 9/2018 | Miles | B65H 1/04 |

* cited by examiner

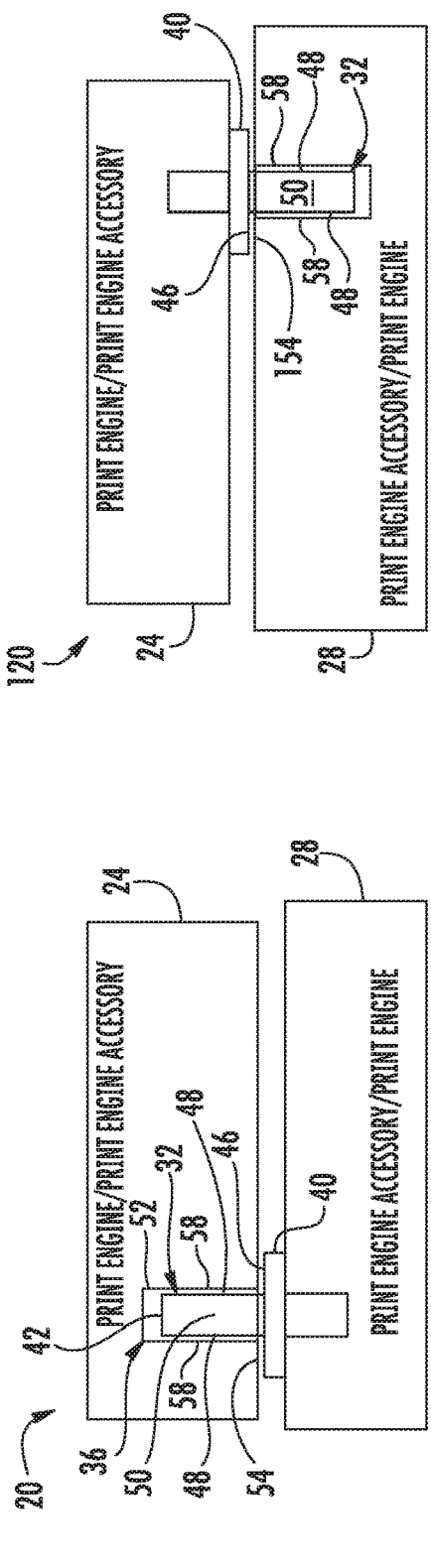

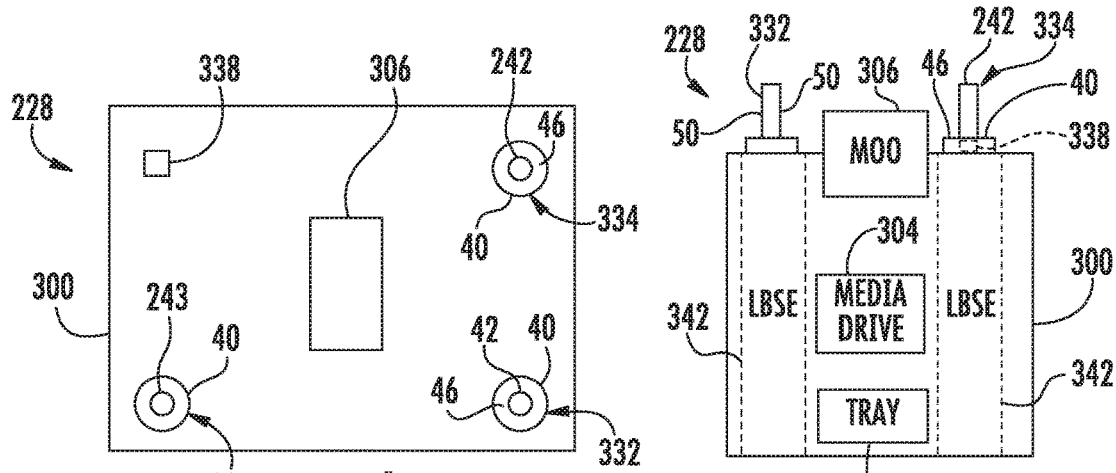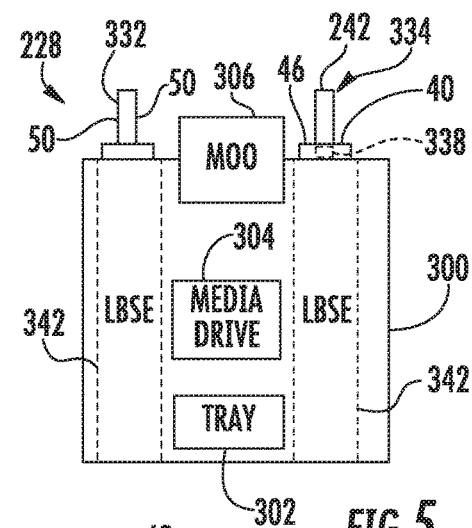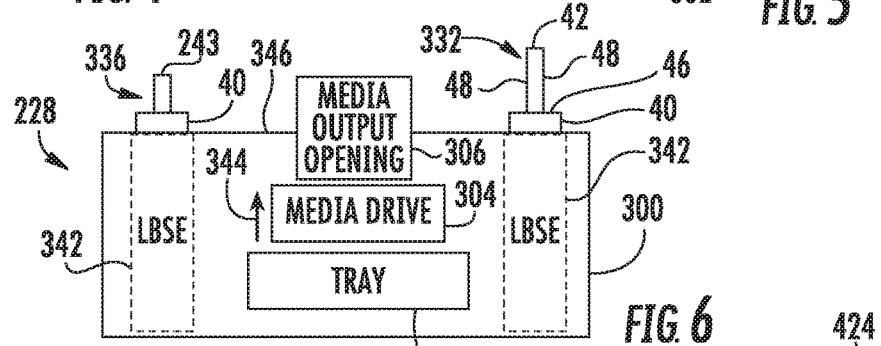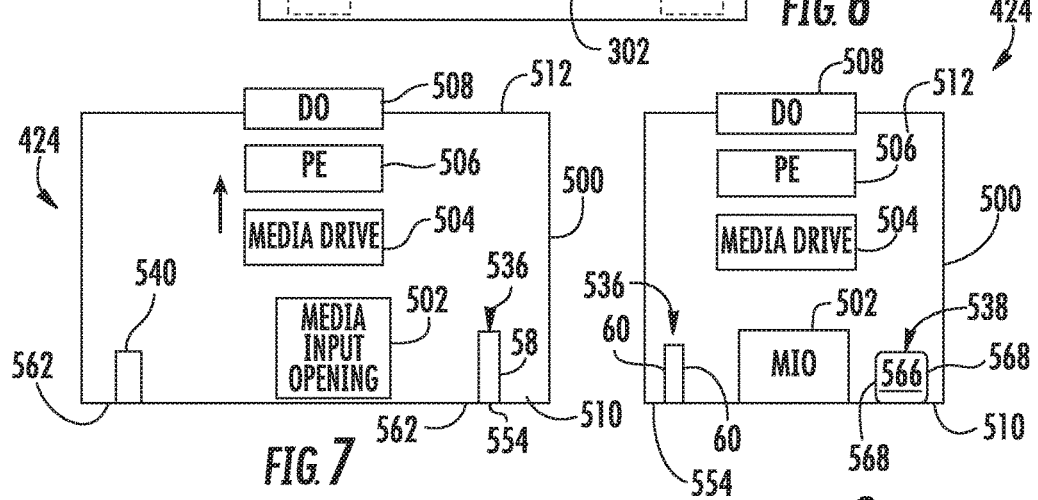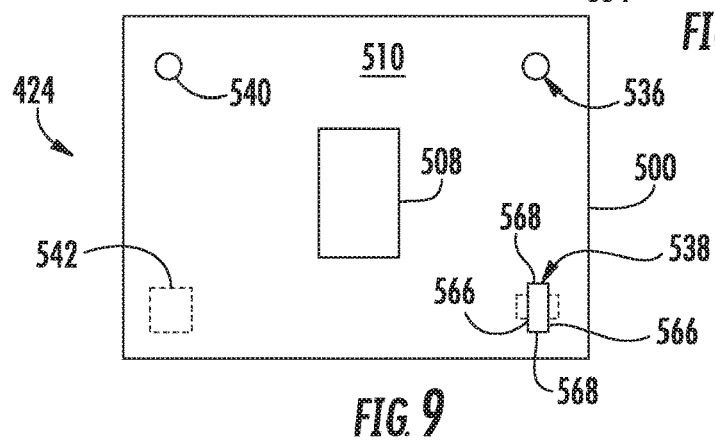

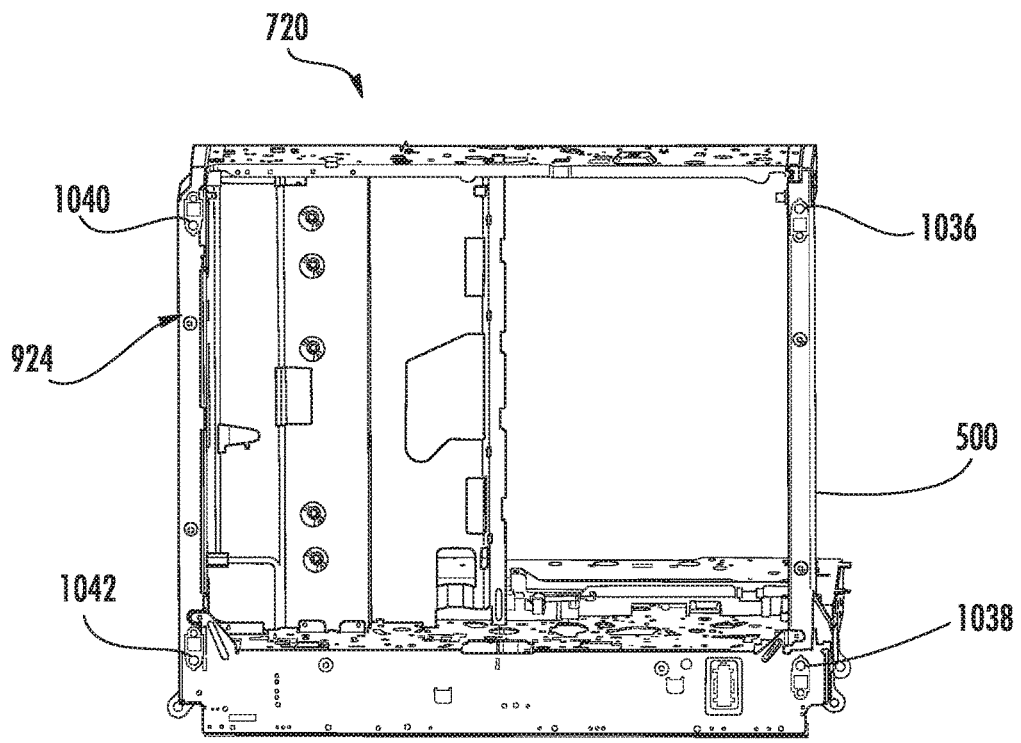
FIG. 15
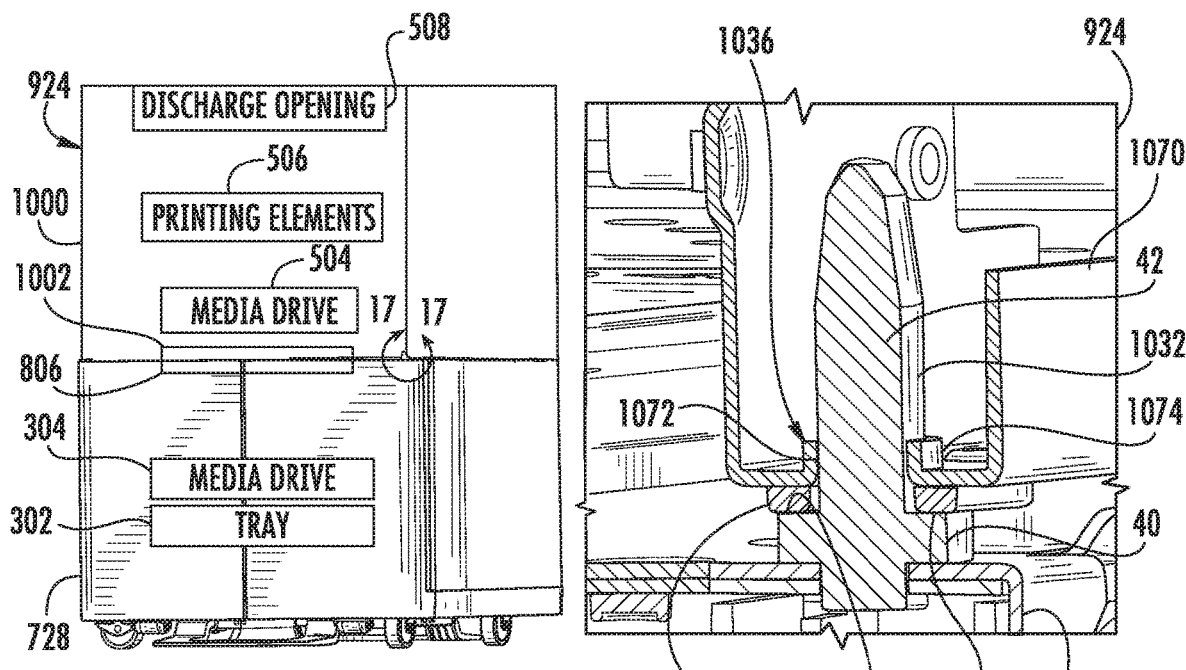
FIG. 16
FIG. 17

PRINT ENGINE AND ACCESSORY MATING

BACKGROUND

Print engines are often utilized width a variety of different accessories. Such accessories may provide the printer with different types or dimensioned print media. Such accessories may provide the printer with additional media handling functions such as duplexing, creasing, perforating, binding and the like. Properly mating and aligning the print engine and its accessory may be difficult.

BRIEF DESCRIPTION OF THE DRAWINGS

FIG. 1 is a sectional view schematically illustrating an example print engine and accessory mating system.

FIG. 2 is a sectional view schematically illustrating an example print engine and accessory mating system.

FIG. 3 is a flow diagram of an example method for mating and aligning the print engine and a print engine accessory.

FIG. 4 is a schematic diagram of a top view of an example print engine accessory.

FIG. 5 is a side sectional view of the example print engine accessory of FIG. 4.

FIG. 6 is a front sectional view of the example print engine accessory of FIG. 4.

FIG. 7 is a front sectional view of an example print engine for use with the example print engine accessory of FIG. 4.

FIG. 8 is a side view of the example print engine of FIG. 7.

FIG. 9 is a bottom view of the example print engine of FIG. 7.

FIG. 15 is a bottom perspective view of portions of an example print engine for use with the example print engine accessory of FIG. 13.

FIG. 16 is a side view of an example print engine accessory mating system including the example print engine accessory of FIG. 13 and the example print engine of FIG. 15.

FIG. 17 is a fragmentary enlarged sectional view of a portion of the system of FIG. 16 taken along line 17-17.

DETAILED DESCRIPTION OF EXAMPLES

Figure 10:
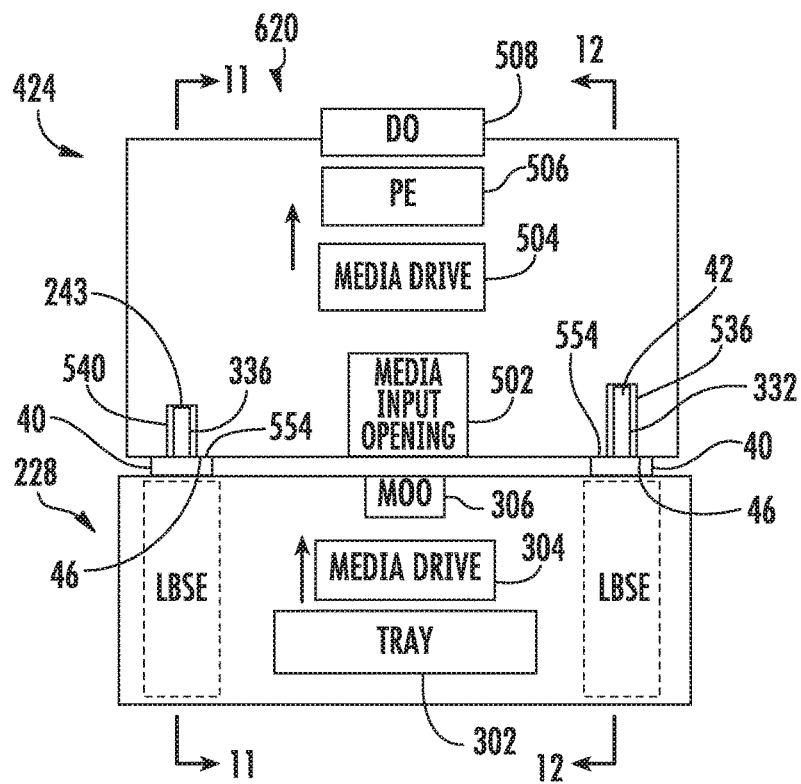
FIG. 10 is a sectional view schematically illustrating the example print engine of FIG. 7 resting upon the example print engine accessory of FIG. 6.

Properly mating and aligning a print engine to the print engine accessory is often difficult. Misalignment may result in sheets of media not being accurately transferred between the print engine and the print engine accessory. Such misalignment may sometimes result in media jams.

The present disclosure provides a print engine and accessory mating system that facilitates proper mating and alignment of a print engine to a print engine accessory. The mating system employs a pin having a shaft and a collar. Side surfaces of the shaft provide left-right and fore-aft datum surfaces while the collar provides a vertical datum surface. In some implementations, the pin is utilized in combination with other pins or datum surfaces to further facilitate alignment of the print engine and print engine accessory by providing additional horizontal and vertical datum surfaces as well as inhibiting relative rotation of the print engine and the print engine accessory.

FIG. 1 schematically illustrates a portion of an example print engine accessory mating system 20. System 20 comprises print engine 24, print engine accessory 28, pin 32 and pin receiving detent 36. Print engine 24 comprises a printing device that prints upon a substrate or media. In one implementation, print engine 24 comprises print mechanism that prints upon sheets of media supplied by accessory 28. In one implementation, print engine 24 comprises a page-wide-array printer having printing elements that span across an entire dimension of the sheets of print media being printed upon. In another implementation, print engine 24 comprises a scanning printer in which a print head is scanned or moved back and forth across the print medium being printed upon. In another implementation, print engine 24 comprises a drop on demand fluid jet printer in which droplets of printing fluid are selectively ejected through nozzles. Examples of such printers include bubble jet printers that may include thermal resistive, or piezo-resistive elements to selectively expel ink or other printing fluid through nozzle openings. In another implementation, print engine 24 may comprise a liquid electrophotography printer or a dry toner electrophotography printer. In yet other implementations, print engine 24 may comprise other print engines utilizing other printing technologies.

Print engine accessory 28 comprises a device that receives printed upon media from print engine 24 or that supplies media to print engine 24. In one implementation, print engine accessory 28 may carry out additional functions or interactions with the media such as duplexing, creasing, perforating, binding and the like. In some implementations, print engine accessory 28 may carry out additional printing functions on the media. In yet other implementations, print engine accessory 28 may comprise a tray or multiple trays providing different sized media or different types of media for being printed upon by print engine 24.

Pin 32 facilitates mating and alignment of print engine 24 and print engine accessory 28 in each of the three axes: a left-right axis (the X axis), a fore-aft axis (the Y-axis) and a vertical axis (the Z-axis). In one implementation, pin 32 projects from print engine accessory 28. Pin 32 comprises collar 40 and shaft 42.

Collar 40 comprises a platform projecting outwardly from the sides of shaft 42. In one implementation, collar 40 comprises an annular ring encircling shaft 42. In another implementation, collar 40 comprises a single radially projecting tab extending outwardly from shaft 42 or a plurality of circumferentially spaced tabs radially projecting from shaft 42. Collar 40 provides a pin vertical axis datum surface 46 that is to abut or contact an opposite datum surface of print engine 24 to vertically locate print engine 24 and print engine accessory 28 relative to one another.

Shaft 42 vertically projects from and above datum surface 46 of collar 40. Shaft 42 comprises opposite transverse sides 48 that provide left-right axis datum surfaces 48 and opposite fore-aft sides (one of which is shown in FIG. 1) which provide fore-aft axis datum surfaces 50. In one implementation, shaft 42 is cylindrical. In other implementations, shaft 42 may have other shapes, such as a polygonal cross-sectional shape.

Pin receiving detent 36 comprises a bore or other cavity 52 projecting into print engine 24. Cavity 52 receives shaft 42 while a lower mouth or perimeter face 54 of detent 636, extending about cavity 52, serves as a vertical axis datum surface by contacting the vertical axis datum surface 46 of collar 40. Cavity 52 further comprises opposite transverse internal sides 58 that serve as left-right axis datum surfaces by facing and contacting the opposite transverse sides 48 of shaft 42. Cavity 52 further comprises opposite fore-aft internal sides (into and out of FIG. 1) that serve as fore-aft axis datum surfaces by facing and contacting the opposite fore-aft sides 50 of shaft 42.

As shown by 1, pin 32 provides a compact single-member that provides datum surfaces in all three axes. Pin 32 may be preassembled or prefabricated and then mounted or otherwise secured to print engine accessory 28. In one implementation, shaft 42 is mounted to collar 40. In another implementation, shaft 42 and collar 40 are integrally formed as a single unitary body, such as being molded together as a single unitary body. Collar 40 provides pin 32 with a vertical axis datum surface 46 that is immediately adjacent to both the left-right axis datum surfaces 48 and the fore-aft axis datum surfaces 50. The adjacency of such three datum surfaces provides enhanced mating and alignment.

In the example illustrated in FIG. 1, print engine accessory 28 underlies and supports print engine 24. Print engine 24 rests upon print engine accessory 28. As further indicated in FIG. 1, in other implementations, this relationship may be reversed. In particular, in other implementations, print engine 24 may underlie print engine accessory 28, wherein print engine accessory 28 rests upon print engine 24. In such an implementation, pin 32 is mounted to and rises from print engine 24 into a pin receiving detent 36 provided in an underside of print engine accessory 28.

FIG. 2 illustrates an example print engine accessory mating system 120. System 120 is similar to system 20 except that the orientations of pin 32 and pin receiving detent 36 are reversed and that print engine accessory 28 provides datum surfaces 154 in place of the datum surfaces 54 provided by print engine 24. Unlike system 20 shown in FIG. 1 where pin 32 is illustrated as projecting upwardly from print engine accessory 28 with vertical axis datum surfaces 54 of print engine 24 resting upon upwardly facing vertical axis datum surfaces 46 of collar 40, in system 120, pin 32 projects from print engine 24 in a downward direction, being received within an upwardly facing pin receiving detent 36. In such an implementation, the vertical axis datum surfaces 46 of collar 40 face downwardly and contact or rest upon corresponding vertical axis datum surfaces 154 provided by print engine accessory 28.

In the example illustrated in FIG. 2, print engine accessory 28 underlies and supports print engine 24. Print engine 24 rests upon print engine accessory 28. As further indicated in FIG. 2, in other implementations, this relationship may be reversed. In particular, in other implementations, print engine 24 may underlie print engine accessory 28, wherein print engine accessory 28 rests upon print engine 24. In such an implementation, pin 32 is mounted to and projects downwardly from print engine accessory 28 into a pin receiving detent 36 provided in an upper side of print engine 24.

With respect to the implementations illustrated in FIGS. 1 and 2, it should be appreciated that spacing or clearance may be provided between each of the opposing datum surfaces to facilitate insertion and withdrawal of pin 32 with respect to detent 36. As a result, such opposing datum surfaces may not always be in direct physical contact. The spacings or clearances between such opposing datum surfaces satisfies predetermined alignment tolerances for the mating of print engine 24 and print engine accessory 28.

FIG. 3 is a flow diagram of an example method 200 for mating and aligning a print engine with a print engine accessory. Although method 200 is described with respect to system 20 of FIG. 1, it should be appreciated that method 200 may be carried out with any of the print engine accessory mating systems described in this disclosure or other print engines and print engine accessories. As indicated by block 204, one of print engine 24 and print engine accessory 28 is rested upon the other of the print engine 24 and the print engine accessory 28. For example, print engine 24 may be lowered onto print engine accessory 28 or vice versa.

As indicated by block 208, the print engine 24 and the print engine accessory 28 are aligned with respect to one another. Such alignment is achieved using a pin 32 and a pin receiving detent 36. The pin 32 has a collar 40 having a pin vertical axis datum surface 46 and a shaft 42 extending from the collar 40. The shaft 42 has first opposite sides providing left-right axis datum surfaces 48 and second opposite sides providing fore-aft axis datum surfaces 50. The pin receiving detent 36 receives the shaft 42 of pin 32. The pin receiving detent 36 may include a detent perimeter providing a detent vertical axis datum surface 54 in contact with the pin vertical axis datum surface 46, first opposite internal sides providing first detent left-right axis datum surfaces 58 facing the pin left-right axis datum surfaces 48 and second opposite internal sides providing detent fore-aft axis datum surfaces facing the pin fore-aft axis datum surfaces 50.

FIGS. 4-6 are diagrams schematically illustrating an example print engine accessory, shown as an example printer tray accessory 228, for mating to a print engine and for supplying print media to the print engine. FIG. 4 is a top view of accessory 228. FIG. 5 is a side view of accessory 228. FIG. 6 is a front view of accessory 228. Printer tray accessory 228 comprises outer frame, body or housing 300, print media tray 302, media drive 304, media output opening 306, datum pin 332, datum pin 334, datum pin 336 and datum emboss 338.

Housing 300 encloses and supports the remaining components of printer tray accessory 228. As schematically illustrated by broken lines, housing 300 comprises load bearing structural elements 342. Load bearing structural elements 342 comprise structures having greater strength and rigidity to support the vertical load of accessory 228 as well as the vertical load of a printer resting upon accessory 228. Such structural elements 342 may comprise a rigid post, column or framework, such as provided in or along the sides or corners of housing 300. Such load bearing structural elements 342 have a greater stiffness and rigidity as compared to other portions of housing 300, resisting structural bending, deflection or sagging underload.

In the example illustrated, such load bearing structural elements 342 underlie each of datum pins 332, 334, 336 and datum emboss 338. Load bearing structural elements 342 extend from directly beneath such datum pins 332, 334, 336 and datum emboss 338 to the bottom of housing 300 which may rest upon the floor, desk or other underlying supporting structure. Because load bearing structural elements 342 directly underlie datum pins 332, 334, 336 and datum emboss 338, the vertical or Z-axis positions provided by the datum surfaces of datum pins 332, 334, 336 and datum emboss 338 are more steadfast and reliable, less prone to deflection, bending or sagging of housing 300 over time.

Tray 302 comprises a compartment, drawer or basin sized and shaped to receive a stack of media sheets for use by a print engine. In some implementations, accessory 228 may comprise multiple different trays 302, wherein each of such trays supplies a different size or type of media. Different trays 302 may also provide different capacities or volumes for containing different volumes of particular types of media.

Media drive 304, schematically shown, comprises a series of mechanisms that singulate a sheet of media from the remaining stack of media within tray 302 and that move or drive the singulated sheet of media through media output opening 306 into the overlying print engine. Media drive 304 may comprise a lift plate for lifting the stack of media, a pick tire for gripping an individual sheet of media on top of the stack and one or more rollers or belts for conveying the singulated sheet of media, generally in the direction indicated by arrow 344, through media output opening 306. In some implementations, portions of media drive 304 may alternatively be provided as part of the overlying print engine, wherein portions of the media drive 304 are alternatively provided as part of the overlying print engine reaching through media output opening 306 to engage the media.

Media output opening or MOO 306 (schematically shown) comprises an opening through an upper face 346 of housing 300. Media output opening 306 is sized to facilitate the movement of individual sheets of media therethrough into the overlying print engine. Datum pins 332, 334, 336 and datum emboss 338 facilitate alignment of media output opening 306 with a corresponding media input opening of an overlying printer engine.

Datum pin 332 is similar to datum pin 32 described above with respect to FIG. 1. Those surfaces or other elements or components of datum pin 332 which correspond to surfaces or other elements or components of datum pin 32 are numbered similarly. As with datum pin 32, datum pin 332 provides datum surfaces for each of the three orthogonal axes: a left-right axis (the X axis), a fore-aft axis (the Y-axis) and a vertical axis (the Z-axis). As with datum pin 32, datum pin 332 projects upwardly from printer tray accessory 228 with a collar 40 having an upper surface providing a vertical axis datum surface 46, with opposite transverse side surfaces providing left-right axis datum surfaces 48 and with front and rear side surfaces providing fore-aft axis datum surfaces 50. In the example illustrated, shaft 42 of pin 332 has a vertical height greater than that of pins 334 and 336, facilitating assembler visible discernment of pin 332 from pins 334 and 336 to assist in ensuring that pin 332 is positioned with respect to the correct corresponding pin receiving detent of the printer engine. In some implementations, pin 332 has a height greater than a depth of the pin receiving detents that are to receive pin 334 and 336, inhibiting accidental insertion of pin 332 into the wrong pin receiving detent of the printer engine.

Datum pin 334 is similar to datum pin 332 except that datum pin 334 does not provide datum surfaces for both the left-right axis and the fore-aft axis. Like datum pin 332, datum pin 334 comprises both a collar 40 and a shaft 242. In contrast to shaft 42 of pin 332, the shaft 242 of datum pin 334 is shaped and sized with respect to its corresponding pin receiving detent of the printer engine such that shaft 242 has much greater clearance along at least one of the axes relative to the much smaller clearance along the same at least one of the axes for datum pin 332. For example, as will be described hereafter, in one implementation, datum pin 334 is received within an elongate slot. The opposite transverse sides of shaft 242 facing the elongated internal side of the slot have locations and clearances corresponding to opposite sides of pin 332. However, front-rear sides of shaft 242, facing in directions along the length of the slot, are spaced from the ends of the slot by distance greater than the clearance between the front-rear sides of shaft 42 of pin 332 and the opposite interior sides of the detent that receives pin 332. Shaft 242 of datum pin 334 cooperates with datum pin 332 to restrict or inhibit relative rotation of printer tray accessory 228 about a vertical axis with respect to the overlying printer engine. Because shaft 242 of datum pin 334 is received within a slot, insertion of a shaft 242 into the slot may be easier as compared to inserting shaft 242 into a closely sized pin receiving detent.

Collar 40 of pin 334 function similar to collar 40 of pin 332. Collar 40 has an upper surface providing a vertical axis datum surface 46 that is to contact or abut the corresponding vertical axis datum surface of the overlying print engine to vertically locate and position the print engine relative to the underlying printer tray accessory 228.

Datum pin 336 is similar to datum pin 334 except that datum pin 336 does not provide any datum surfaces or locating surfaces in either of the left-right axis directions or the fore-aft axis directions. Similar to datum pin 334, datum pin 336 comprises collar 40 and a shaft 243. However, shaft 243 is sized much smaller than the corresponding pin receiving detent in both or along both the left-right axis and the front-rear or fore-aft axis. Shaft 243 is sized and shaped so as to have a spacing or clearance with respect to the internal sides of the pin receiving detent that receives shaft 243 that is greater than the spacing or clearance between the sides of shaft 42 and the corresponding internal sides of the pin receiving detent that receives shaft 42.

Collar 40 of pin 336 functions similar to collar 40 of pins 332 and 334. Collar 40 of pin 336 has an upper surface providing a vertical axis datum surface 46 that is to contact or abut the corresponding vertical axis datum surface of the overlying print engine to vertically locate and position the print engine relative to the underlying printer tray accessory 228.

Datum emboss 338 comprises a raised or elevated portion of the upper face 346 of housing 300 that has a height above the remaining surrounding face 346, corresponding to the height of the upper surface of each of collars 40. In one implementation, the upper face 346 of housing 300 comprises a sheet-metal, wherein data emboss 338 comprises an embossment of the sheet-metal. Data emboss 338 provides a fourth vertical axis datum surface to assist in providing a level orientation for the printer engine resting upon printer tray accessory 228.

As shown by FIG. 4, pin 332 and 334 are on opposite fore-aft sides of media output opening 306. Likewise, pins 332 and 336 are also on opposite transverse sides of media output 306. Emboss 338 is also located on an opposite side of opening 306 relative to pin 334 and relative to pin 336. As a result, pins 332, 334, 336 and emboss 338 provide enhanced leveling and stability for the overlying print engine.

FIGS. 7-9 schematically illustrates an example print engine 424 for use with printer tray accessory 228 described above. Print engine 424 is to rest on top of printer tray accessory 228. Print engine 424 comprises housing 500, media input opening 502, media drive 504, printing elements 506, discharge opening 508, pin receiving detents 536, 538, 540 and datum surface 542.

Housing 500 comprises an outer frame, body or enclosure extending about and supporting the remaining internal components of print engine 424. Housing 500 comprises a lower surface 510 through which media input opening 502 extends and an opposite upper surface 512 through with discharge opening 508 extends. In other implementations, media discharge opening 508 may be provided at other locations, such as through a side wall of housing 500. Portions of the lower surface 510 of housing 500 provide datum surface 542 which interacts with the vertical axis datum surface provided by datum emboss 338.

Pin receiving detent 536 is similar to pin receiving detent 36 described above. Pin receiving detent 536 receives shaft 42 of data pin 332. As with pin receiving detent 36, pin receiving detent 536 has orthogonal opposite internal sides that serve as left-right axis datum surfaces 58 and fore-aft axis datum surfaces 60 by facing and extending into close proximity or contact with the datum surfaces 48 and 50, respectively, of shaft 42. Pin receiving detent 536 has a mouth or perimeter 562 formed along bottom face 510 of housing 500 that directly rests upon collar 40 so as to serve as a vertical axis datum surface 554.

Pin receiving detent 538 comprises a slot, oval or other elongated non-circular shaped bore or cavity extending into lower face 510 of housing 500 so as to receive datum pin 334 when engine 424 is resting upon an properly aligned with accessory 228. Pin receiving detent 538 has internal sides 566 that face and extend in close proximity to opposite transverse (left-right) sides of shaft 242. Such internal sides 566 cooperate with the other datum pins to inhibit or restrict relative rotation of engine 424 and accessory 228. Detent 538 has internal end surfaces 568 that are spaced from the opposite fore-aft sides of shaft 242 by distance greater than the fore-aft clearance between shaft 332 and detent 536 such that detent 538 does not provide datum positioning in the fore-aft direction.

As illustrated by broken lines, in other implementations, the orientation of the slot forming detent 538 may be rotated 90 degrees, wherein detent 538 does not provide data positioning in the left-right (X axis) direction. In some implementations, the clearance or spacing between all of the interior sides of detent 538 and the corresponding exterior sides of shaft 242 of pin 334 is greater than the clearance or spacing between the exterior sides of shaft 42 of datum pin 332 and the interior sides of detent 536 such that neither pin 334 nor detent 538 provide fore-aft or left-right datum positioning, but merely limit relative rotation of accessory 228 and print engine 424 to an acceptable extent. Portions of lower face 510 about detent 568 serve as vertical axis datum surfaces, resting upon collar 40 and datum surface 46 of pin 334.

Pin receiving detent 540 comprises a bore extending into face 510 for receiving shaft 243 of datum pin 336. Detent 540 has an internal cross sectional area greater than that of shaft 243. The internal sides of detent 540 are spaced from the opposite exterior sides of shaft 243 by distances greater than the corresponding clearances between shaft 42 of pin 332 and the interior sides of detent 536. The interior sides of detent 540 do not provide left-right or fore-aft datum surfaces, but are spaced to facilitate easier location insertion of shaft 243 into detent 540. As with pin receiving detents 536 and 538, pin receiving detent 540 has a perimeter 562 along face 510 about the bore that provide a vertical axis datum surface by resting upon collar 40 of datum pin 336.

Figures 11, 12:
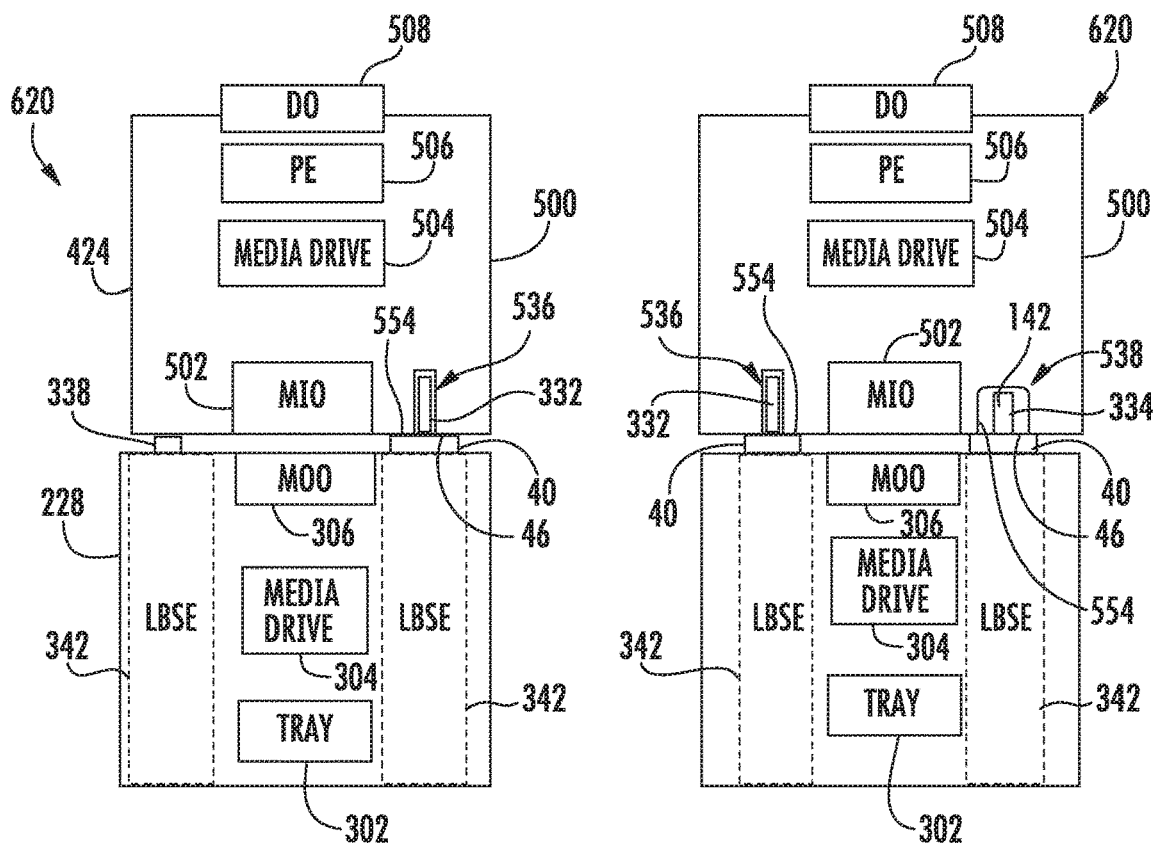
FIG. 11 is a sectional view illustrating the example print engine of FIG. 7 resting upon the example print engine accessory and taken along line 11-11 of FIG. 6.
FIG. 12 is a sectional view illustrating the example print engine of FIG. 7 resting upon the example print engine accessory and taken along line 12-12 of FIG. 6.

FIGS. 10-12 illustrate the example print engine and accessory mating system 620 comprising print engine 424 resting upon printer tray accessory 228. FIG. 10 is a front view of system 620 while FIGS. 11 and 12 are left and right side views, respectively, of system 620. As schematically illustrated by FIGS. 10-12, datum pins 332, 334, 336 and datum emboss 338 cooperate with pin receiving detents 536, 538, 540 and datum surface 542, respectively, to locate and align accessory 228 relative to print engine 424 such that media output opening 306 and media input opening 502 are accurately aligned.

Print engine 424 is maintained in a level orientation with the vertical axis datum surfaces 46 of collars 40 of each of datum pins 332, 334, 336 of accessory 228 and the corresponding vertical axis datum surfaces provided in face 510 of print engine 424 which rest upon datum surfaces 46. The alignment of print engine 424 and accessory 228 in the transverse direction, along the left-right axis, is provided by the interaction of the left and right opposite exterior surfaces of shaft 42 that form datum surfaces 48 of datum pin 332 and the left and right opposite interior surfaces that form datum surfaces 58 of pin receiving detent 536. The alignment of print engine 424 and accessory 228 in the longitudinal direction, along the fore-aft or front-rear direction, is provided by the interaction of the fore-aft opposite end exterior surfaces of shaft 42 that form datum surfaces 50 of datum pin 332 and the fore-aft opposite interior surfaces that form datum surfaces 60 of pin receiving detent 536. Relative rotation of print engine 424 and accessory 228 is inhibited or prevented through the interaction of the shaft 242 of datum pin 334 and the interior transverse sides of the slot provided by detent 538.

Figure 13:
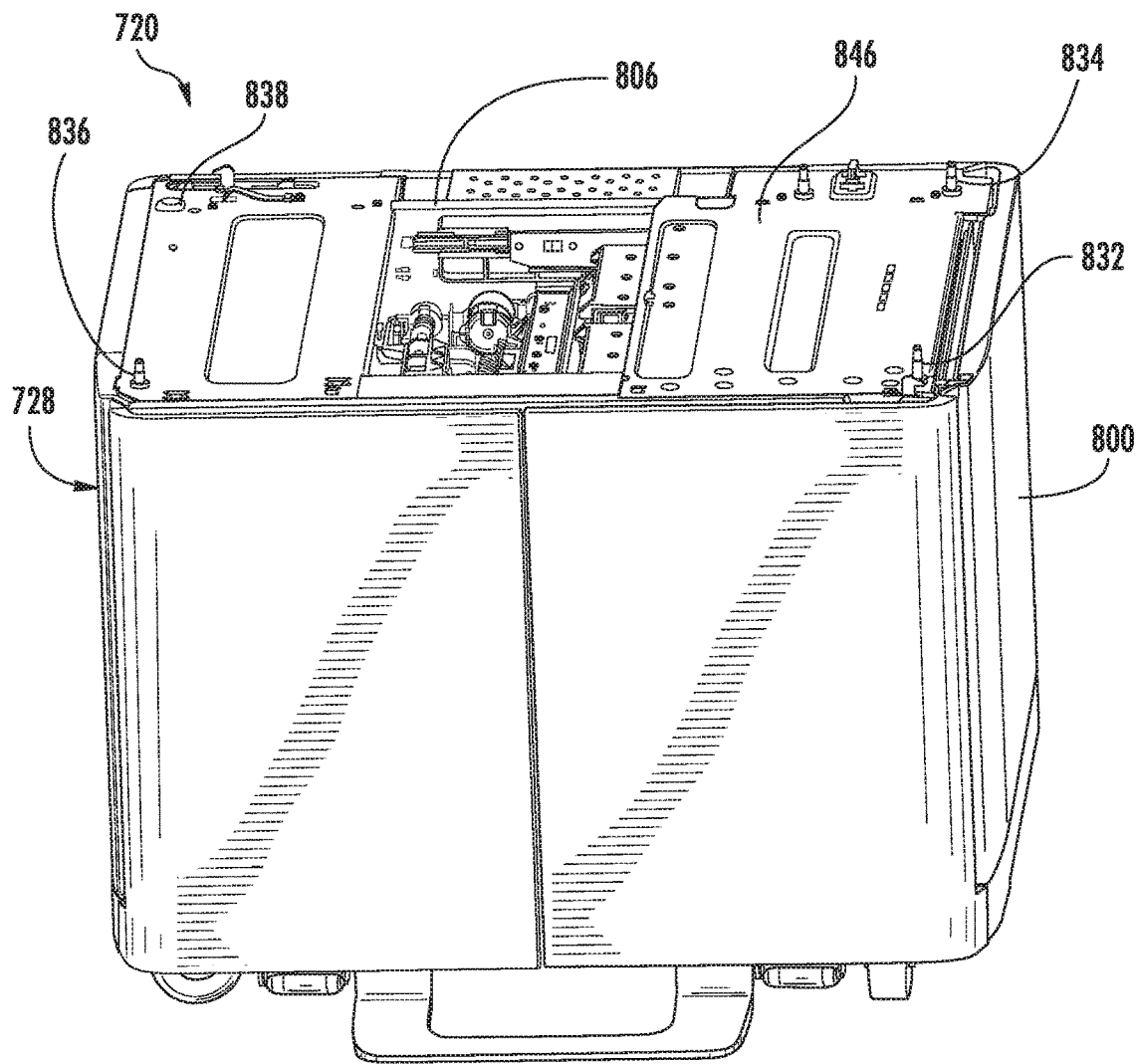
FIG. 13 is a front perspective view of an example print engine accessory.
Figure 14:
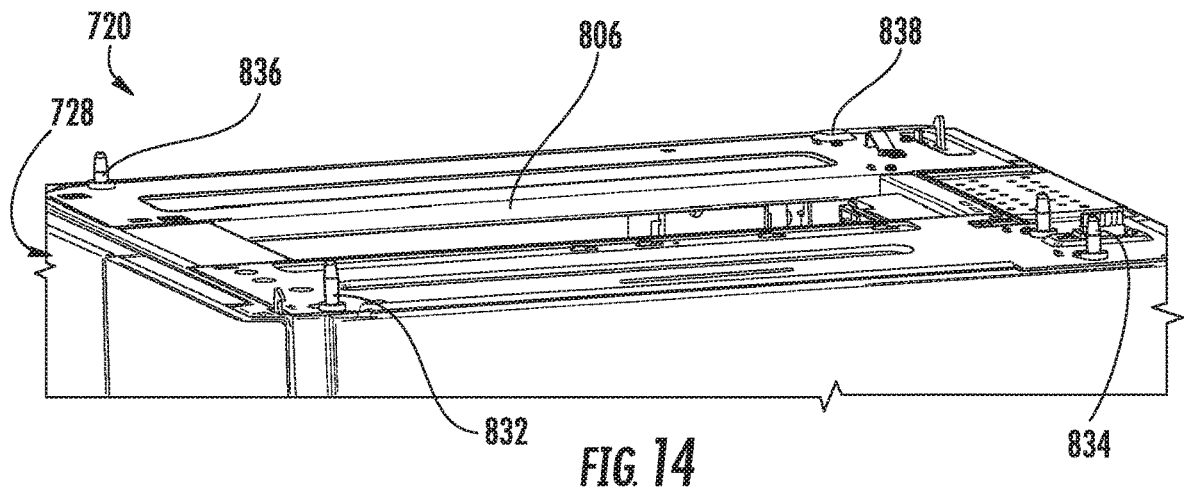
FIG. 14 is a right perspective view of the example print engine accessory of FIG. 13.

FIGS. 13-17 illustrate an example print engine accessory mating system 720. FIGS. 13 and 14 illustrate an example print engine accessory, shown as print tray accessory 728. Printer tray accessory 228 comprises outer frame, body or housing 800, print media tray 302 (schematically shown in FIG. 16), media drive 304 (schematically shown in FIG. 16), media output opening 806, datum pin 832, datum pin 834, datum pin 836 and datum emboss 838.

Housing 800 encloses and supports the remaining components of printer tray accessory 728. Housing 800 comprises load bearing structural elements 842, one of which is shown in FIG. 17. Load bearing structural elements 842 comprise structures having greater strength and rigidity to support the vertical load of accessory 728 as well as the vertical load of a printer resting upon accessory 728. Such structural elements 842 may comprise a rigid post, column or framework, such as provided in or along the sides or corners of housing 800. Such load bearing structural elements have a greater stiffness and rigidity as compared to other portions of housing 800, resisting structural bending, deflection or sagging underload.

In the example illustrated, such load bearing structural elements 842 underlie each of datum pins 832, 834, 836 and datum emboss 838. Load bearing structural elements 842 extend from directly beneath such datum pins 832, 834, 836 and datum emboss 838 to the bottom of housing 800 which may rest upon the floor, desk or other underlying supporting structure. Because load bearing structural elements 842 directly underlie datum pins 832, 834, 836 and datum emboss 838, the vertical or Z-axis positions provided by the datum surfaces of datum pins 832, 834, 836 and datum emboss 838 is more steadfast and reliable, less prone to deflection, bending or sagging of housing 800 over time.

Tray 302 and media drive 304 are described above. Media output opening 806 comprises an opening through an upper face 846 of housing 800. Media output opening 806 is sized to facilitate the movement of individual sheets of media therethrough into the overlying print engine 924 (shown in FIGS. 15-17). Datum pins 832, 834, 836 and datum emboss 838 facilitate alignment of media output opening 806 with a corresponding media input opening of an overlying printer engine.

Datum pin 832 is similar to datum pin 332 described above. Those surfaces or other elements or components of datum pin 332 which correspond to surfaces or other elements or components of datum pin 32 are numbered similarly. As with datum pin 332, datum pin 832 provides datum surfaces for each of the three orthogonal axes: a left-right axis (the X axis), a fore-aft axis (the Y-axis) and a vertical axis (the Z-axis). As with datum pin 332, datum pin 832 projects upwardly from printer tray accessory 228 with a collar 40 having an upper surface providing a vertical axis datum surface 46, with opposite transverse side surfaces providing left-right axis datum surfaces 48 and with front and rear side surfaces providing fore-aft axis datum surfaces 50. In the example illustrated, shaft 42 of pin 832 has a vertical height greater than that of pins 834 and 836, facilitating assembler visible discernment of pin 832 from pins 834 and 836 to assist in ensuring that pin 832 is positioned with respect to the corresponding pin receiving detent of the printer engine. In some implementations, pin 832 has a height greater than a depth of the pin receiving detents that are to receive pin 834 and 836, inhibiting accidental insertion of pin 832 into the wrong pin receiving detents of the printer engine.

Datum pins 834 and 836 are similar to datum pins 334 and 336, respectively. Those components or surfaces of datum pins 834 and 836 which correspond to surfaces or components of datum pins 334 and 336 are numbered similarly. In the example illustrated, shaft 242 and collar 40 of datum pin 834 are integrally formed as a single unitary body. Likewise, shaft 243 and collar 40 of datum pin 836 are also integrally formed as a single unitary body. As with shaft 42 of datum pin 332, each of shaft 242 and 243 have a tapering or pointed end to facilitate insertion of shafts 42, 242 and 243 into their respective pin receiving detents of the print engine.

FIG. 15 is a bottom view of an example print engine 924 for use with printer tray accessory 728 described above. Print engine 924 is to rest on top of printer tray accessory 728. Print engine 924 comprises housing 1000, media input opening 1002 (schematically shown), media drive 504, printing elements 506, discharge opening 508, pin receiving detents 1036, 1038, 1040 and datum surface 1042. Media drive 504, printing element 506 and discharge opening 508 (each of which is schematically shown) are described above with respect to print engine 424.

Housing 500 comprises an outer frame, body or enclosure extending about and supporting the remaining internal components of print engine 424. Housing 500 comprises a lower surface 510 through which media input opening 502 extends and an opposite upper surface 512 through with discharge opening 508 extends. In other implementations, media discharge opening 508 may be provided at other locations, such as through a side wall of housing 500. Portions of the lower surface 510 of housing 500 provide datum surface 542 which interacts with the vertical axis datum surface provided by datum emboss 338.

Pin receiving detents 1036, 1038, 1040 and datum surface 1042 are similar to pin receiving detents 536, 538, 540 and datum surface 542, respectively, described above. Those components or surfaces of 1036, 1038, 1040 and datum surface 1042 which correspond to surfaces or components of pin receiving detents 536, 538, 540 and datum surface 542 are numbered similarly.

FIG. 17 is a sectional view illustrating pin receiving detent 1036 receiving datum pin 1032. As shown by FIG. 17, in the example illustrated, shaft 42 and collar 40 of datum pin 1032 are integrally formed as a single unitary body. As further shown by FIG. 17, pin receiving detent 1036 comprises a metal frame portion 1070 of housing 500 and each of the corners of print engine 924. The metal frame portion 1070 comprises an opening 1072 surrounded by an upturned sleeve 1074, wherein the sleeve 1074 receives shaft 42. The sleeve 1074 has internal surfaces that form the left-right and fore-aft datum surfaces 58, 60 (shown in FIGS. 7-9). As further shown by FIG. 17, in the example illustrated, detent 1036 further comprises an annular ring or standoff 1076 which directly rests upon collar 40 and provide the vertical axis datum surface 554 of detent 1036.

In the example illustrated, each of the other pin receiving detents, detents 1038 and 1040 have similar constructions, being formed by an opening surrounded by an upturned sleeve that receives the shaft of the datum pin. As discussed above, the relative sizes and shapes of the openings differ from that of detent 1036. In particular, detent 1038 has an elongated shape so as to restrict relative rotation of print engine 924 and print tray accessory 728 while not providing a datum surface for at least one orthogonal horizontal axis, not providing a datum surface for either or both of the left-right axis or the fore-aft axis. Detent 1040 is sized greater than the shaft 243 of the datum pin 836 so as to not provide either horizontal datum surfaces while providing a vertical axis datum surface.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:
1. An accessory mating system comprising:
a print engine;
a print engine accessory;
a pin extending from one of the print engine and the print engine accessory, the pin having a collar having a pin vertical axis datum surface and a shaft extending from the collar, the shaft having left-right axis datum surfaces and fore-aft axis datum surfaces;
a pin receiving detent coupled to one of the print engine and the print engine accessory, the pin receiving detent receiving the pin, the pin receiving detent comprising:
a detent perimeter providing a first detent vertical axis datum surface;
first opposite internal sides providing first detent left-right axis datum;

second opposite internal sides providing first detent fore-aft axis datum surfaces;
a second pin receiving detent coupled to one of the print engine and the print engine accessory, the second pin receiving detent receiving a second pin, the second pin receiving detent comprising a slot having a length longer than a diameter of the second pin, the slot comprising:
a slot perimeter providing a second detent vertical axis datum surface; and
slot sides facing opposite sides of the second pin.

2. The accessory mating system of claim 1 further comprising:
a third pin extending from one of the print engine and the print engine accessory, the third pin being spaced from the pin and the second pin, the third pin having a third collar having a third pin vertical axis datum surface and a third shaft extending from the third collar; and
a third pin receiving detent coupled to one of the print engine and the print engine accessory, the third pin receiving detent receiving the third pin, the third pin receiving detent out of contact with sides of the third pin, the third pin receiving detent comprising a third pin receiving detent perimeter providing a third detent vertical axis datum surface.

3. The accessory mating system of claim 2, wherein the print engine accessory comprises a media input tray for the print engine, the media input tray comprising a media output opening through which media supplied from the media input tray to the printer, wherein the pin and the third pin are on opposite left-right sides of the media output opening.

4. The accessory mating system of claim 3, wherein the pin and the second pin on opposite front-rear sides of the media output opening.

5. The print engine accessory mating system of claim 4 further comprising an emboss vertical axis datum surface projecting from one of the print engine and the print engine accessory, wherein the pin, the second pin, the third pin and the emboss are at four corners of a junction of the print engine and the print engine accessory.

6. The print engine accessory mating system of claim 2, wherein the shaft has a first height, wherein the second shaft has a second height, wherein the third shaft has a third height and wherein the first height is greater than the second height and the third height.

7. The accessory mating system of claim 2, wherein the pin, the second pin and the third pin project upright from the print engine accessory into a bottom of the print engine.

8. The accessory mating system of claim 1 further comprising:
a second pin extending from one of the print engine and the print engine accessory, the second pin being spaced from the pin, the second pin having a second collar having a second pin vertical axis datum surface and a second shaft extending from the second collar; and
a second pin receiving detent coupled to one of the print engine and the print engine accessory, the second pin receiving detent receiving the second pin, the second pin receiving detent out of contact with sides of the second pin, the second pin receiving detent comprising a second pin receiving detent perimeter providing a second detent vertical axis datum surface.

9. A method for mating a print engine and a print engine accessory, the method comprising:
resting one of a print engine and a print engine accessory upon the other of the print engine and the print engine accessory; and
aligning the print engine and the print engine accessory using:
a pin extending from one of the print engine and the print engine accessory, the pin having a collar having a pin vertical axis datum surface and a shaft extending from the collar, the shaft providing pin left-right axis datum surfaces and second opposite sides providing pin fore-aft axis datum surfaces; and
a pin receiving detent coupled to one of the print engine and the print engine accessory, the pin receiving detent receiving the pin, the pin receiving detent comprising:
a detent perimeter providing a first detent vertical axis datum surface;
first opposite internal sides providing first detent left-right axis datum surfaces facing the pin left-right axis datum surfaces; and
second opposite internal sides providing first detent fore-aft axis datum surfaces facing the pin fore-aft axis datum surfaces, wherein the aligning of the print engine and the print engine accessory is further carried out using:
a second pin extending from one of the print engine and print engine accessory, the second pin being spaced from the pin, the second pin having a second collar having a second pin vertical axis datum surface and a second shaft extending from the second collar; and
a third pin extending from one of the print engine and the print engine accessory, the third pin being spaced from the pin and the second pin, the third pin having a third collar having a third pin vertical axis datum surface and a third shaft extending from the third collar;
a second pin receiving detent coupled to one of the print engine and the print engine accessory, the second pin receiving detent receiving the second pin, the second pin receiving detent comprising a slot having a length longer than a diameter of the second pin, the slot comprising:
a slot perimeter providing a second detent vertical axis datum surface in contact with the second pin vertical axis datum surface;
slot sides facing opposite sides of the second pin; and
a third pin receiving detent coupled to one of the print engine and the print engine accessory, the third pin receiving detent receiving the third pin, the third pin receiving detent out of contact with sides of the third pin, the third pin receiving detent comprising a third pin receiving detent perimeter providing a third detent vertical axis datum surface.

10. And accessory mating system comprising:
a print engine;
a print engine accessory;
a pin extending from one of the print engine and the print engine accessory, the pin having a collar having a pin vertical axis datum surface and a shaft extending from the collar, the shaft having left-right axis datum surfaces and fore-aft axis datum surfaces;
a pin receiving detent coupled to one of the print engine and the print engine accessory, the pin receiving detent receiving the pin, the pin receiving detent comprising:
a detent perimeter providing a first detent vertical axis datum surface;
first opposite internal sides providing first detent left-right axis datum; and
second opposite internal sides providing first detent fore-aft axis datum surfaces;
a second pin extending from one of the print engine and the print engine accessory, the second pin being spaced from the pin, the second pin having a second collar having a second pin vertical axis datum surface and a second shaft extending from the second collar; and a second pin receiving detent coupled to one of the print engine and the print engine accessory, the second pin receiving detent receiving the second pin, the second pin receiving detent out of contact with sides of the second pin, the second pin receiving detent comprising a second pin receiving detent perimeter providing a second detent vertical axis datum surface.

11. The accessory mating system of claim 10 further comprising:

a third pin extending from one of the print engine and the print engine accessory; and a third pin receiving detent coupled to one of the print engine and the print engine accessory, the third pin receiving detent receiving the third pin, the third pin receiving detent out of contact with sides of the third pin.

12. The accessory mating system of claim 11 further comprising an emboss vertical axis datum surface projecting from the print engine accessory, wherein the first pin, the second pin, the third pin and the emboss are at four corners of the print engine accessory.

13. The printer tray accessory of claim 11, wherein the first pin and the third pin are on opposite left-right sides of the media output opening and wherein the first pin and the second pin on opposite front-rear sides of the media output opening.

14. The printer tray accessory of claim 10, wherein the first pin, the second pin and the third pin overlie a first load bearing structural element, a second load bearing 1 structural element and a third load bearing structural element, respectively, of the printer tray accessory.

* * * * *